United States Patent
Hu et al.

(10) Patent No.: US 11,799,333 B2
(45) Date of Patent: Oct. 24, 2023

(54) PERMANENT MAGNET AUXILIARY SYNCHRONOUS RELUCTANCE MOTOR AND ELECTRIC VEHICLE PROVIDED WITH SAME

(71) Applicant: GREE ELECTRIC APPLIANCES, INC. OF ZHUHAI, Guangdong (CN)

(72) Inventors: Yusheng Hu, Zhuhai (CN); Bin Chen, Zhuhai (CN); Yong Xiao, Zhuhai (CN); Tong Tong, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 219 days.

(21) Appl. No.: 16/976,942

(22) PCT Filed: Dec. 7, 2018

(86) PCT No.: PCT/CN2018/119875
§ 371 (c)(1),
(2) Date: Aug. 31, 2020

(87) PCT Pub. No.: WO2019/174326
PCT Pub. Date: Sep. 19, 2019

(65) Prior Publication Data
US 2021/0006109 A1 Jan. 7, 2021

(30) Foreign Application Priority Data

Mar. 16, 2018 (CN) .......................... 201810219845.8

(51) Int. Cl.
*H02K 1/27* (2022.01)
*H02K 21/14* (2006.01)
(Continued)

(52) U.S. Cl.
CPC ............. *H02K 1/276* (2013.01); *H02K 21/14* (2013.01); *H02K 29/03* (2013.01); *H02K 2213/03* (2013.01)

(58) Field of Classification Search
CPC ...... H02K 1/246; H02K 1/2766; H02K 1/276; H02K 21/14; H02K 29/03; H02K 2213/03; H02K 19/103; Y02T 10/64
(Continued)

(56) References Cited

U.S. PATENT DOCUMENTS 6,008,559 A * 12/1999 Asano .................... H02K 1/276
310/216.073
8,102,091 B2 * 1/2012 Ionel .................... H02K 1/2766
310/156.53
(Continued)

FOREIGN PATENT DOCUMENTS

CN 102761221 A 10/2012
CN 103166407 A 6/2013
(Continued)

OTHER PUBLICATIONS

Translation of foreign document JP 2007116822 A (Year: 2007).*
(Continued)

*Primary Examiner* — Alex W Mok
(74) *Attorney, Agent, or Firm* — J. Miguel Hernandez; James R. Gourley; Carstens, Allen & Gourley, LLP

(57) ABSTRACT

A permanent magnet auxiliary synchronous reluctance motor includes a stator portion and a rotor portion. The stator portion includes a stator core and a winding embedded in the stator core. The stator core is provided with a stator tooth and a stator slot. The rotor portion is provided inside the stator portion; a rotor body of the rotor portion is provided with a plurality of permanent magnet slot groups which are evenly arranged along a circumferential direction of the
(Continued)

rotor body; each of the permanent magnet slot groups is provided with multiple layers of permanent magnet slots; a distance between end portions of adjacent permanent magnet slots between adjacent permanent magnet slot groups is less than or equal to a width of a stator tooth boot of the stator tooth, and the number of slots per pole and per phase of the motor is two or three.

12 Claims, 16 Drawing Sheets

(51) Int. Cl.
*H02K 1/276* (2022.01)
*H02K 29/03* (2006.01)

(58) Field of Classification Search
USPC .................................................. 310/156.56
See application file for complete search history.

(56) References Cited

U.S. PATENT DOCUMENTS

| | | | |
|---|---|---|---|
| 2002/0153796 A1 | 10/2002 | Yoshinaga et al. | |
| 2003/0094875 A1 | 5/2003 | Sakuma et al. | |
| 2012/0187877 A1 | 7/2012 | Yamagiwa et al. | |
| 2013/0320797 A1 | 12/2013 | Vyas et al. | |
| 2014/0346911 A1 | 11/2014 | Tsuchida et al. | |
| 2017/0187257 A1 | 6/2017 | Liu et al. | |

FOREIGN PATENT DOCUMENTS

| | | |
|---|---|---|
| CN | 104600938 A | 5/2015 |
| CN | 204442139 U | 7/2015 |
| CN | 108322006 A | 7/2018 |
| CN | 208094415 U | 11/2018 |
| JP | 2007116822 A | 5/2007 |
| JP | 2013132149 A | 7/2013 |

OTHER PUBLICATIONS

Extended European Search Report for European Application No. 18910035.7 dated Mar. 25, 2021 (13 pages).
International Search Report for Application No. PCT/CN2018/119875 dated Feb. 27, 2019 (3 pages).
Office Action for European Application No. EP 18910035.7 dated Mar. 23, 2023 (10 pages).

* cited by examiner

PERMANENT MAGNET AUXILIARY SYNCHRONOUS RELUCTANCE MOTOR AND ELECTRIC VEHICLE PROVIDED WITH SAME

CROSS REFERENCE TO RELATED APPLICATION

This application is a U.S. National Stage of International Application No. PCT/CN2018/119875, entitled "Permanent Magnet Auxiliary Synchronous Reluctance Motor and Electric Vehicle Provided With Same," filed on Dec. 7, 2018 and published as WO 2019/174326 on Sep. 19, 2019, which claims priority to Chinese Patent Application No. 201810219845.8, entitled "Permanent Magnet Auxiliary Synchronous Reluctance Motor and Electric Vehicle Provided With Same," filed on Mar. 16, 2018. Each application, publication, and patent listed in this paragraph is hereby incorporated by reference in its entirety as an example.

TECHNICAL FIELD

The present disclosure relates to a technical field of vehicle equipment, and more particularly, relates to a permanent magnet auxiliary synchronous reluctance motor and an electric vehicle provided with the same.

BACKGROUND

Electric vehicles have characteristics of energy saving and environmental protection or the like, and have developed rapidly. For an existing electric vehicle drive motor, in order to implement functions of a high power density and a high efficiency or the like of the motor, more and more motors adopt a high-performance rare earth permanent magnet motor. The rare earth permanent magnet motor can achieve the high efficiency and the high power density, because it mainly depends on a high-performance rare earth permanent magnet. At present, a neodymium iron boron rare earth permanent magnet is most widely used. However, the rare earth is a non-renewable resource, a price of the rare earth is relatively expensive, and the price of the rare earth also fluctuates greatly, resulting in a higher production cost of the electric vehicle drive motor, which is not conducive to promoting a comprehensive development of the electric vehicle. Furthermore, in the prior art, a ferrite permanent magnet auxiliary synchronous reluctance motor is also applied to the electric vehicle, but such motor has problems of high noise, easy demagnetization, and low efficiency, etc.

SUMMARY

An objective of the present disclosure is to provide a permanent magnet auxiliary synchronous reluctance motor and an electric vehicle provided with the same to solve a problem of low efficiency of a motor in the prior art.

In order to achieve the above objective, according to an aspect of the present disclosure, a permanent magnet auxiliary synchronous reluctance motor is provided. The permanent magnet auxiliary synchronous reluctance motor includes: a stator portion including a stator core and a winding embedded in the stator core, the stator core having a stator tooth and a stator slot; and a rotor portion provided inside the stator portion, a rotor body of the rotor portion being provided with a plurality of permanent magnet slot groups, the plurality of permanent magnet slot groups being evenly arranged along a circumferential direction of the rotor body, each of the permanent magnet slot groups being provided with multiple layers of permanent magnet slots, a distance between an end portion of a permanent magnet slot in a permanent magnet slot group and an end portion of an adjacent permanent magnet slot in an adjacent permanent magnet slot group being less than or equal to a width of a stator tooth boot of the stator tooth, and a number of slots per pole and per phase of the motor is two or three.

In an embodiment, a permanent magnet slot group includes an outer layer of permanent magnet slot and an inner layer of permanent magnet slot, a magnetic conduction channel is formed between the outer layer of permanent magnet slot and the inner layer of permanent magnet slot, the inner layer of permanent magnet slots of two adjacent permanent magnet slot groups are arranged adjacently, and a distance between end portions of adjacent inner layer of permanent magnet slots is less than or equal to a width of the stator tooth.

In an embodiment, the plurality of permanent magnet slot groups include a first permanent magnet slot group and a second permanent magnet slot group, the first permanent magnet slot group includes a first inner layer of permanent magnet slot and a first outer layer of permanent magnet slot, a first magnetic conduction channel is formed between the first inner layer of permanent magnet slot and the first outer layer of permanent magnet slot; the second permanent magnet slot group includes a second inner layer of permanent magnet slot and a second outer layer of permanent magnet slot, a second magnetic conduction channel is formed between the second inner layer of permanent magnet slot and the second outer layer of permanent magnet slot; a third magnetic conduction channel is formed between a portion of the first inner layer of permanent magnet slot and a portion of the second outer layer of permanent magnet slot.

In an embodiment, the first permanent magnet slot group further includes: a first bent slot, a first end of the first bent slot is in communication with a first end of the first inner layer of permanent magnet slot, a second end of the first bent slot extends toward an outer edge of the rotor body; the first bent slot has a first cut edge; a first end of the first cut edge is connected to a side wall of the first inner layer of permanent magnet slot adjacent to the first outer layer of permanent magnet slot; a second end of the first cut edge is arranged to extend toward the outer edge of the rotor body and gradually away from the first outer layer of permanent magnet slot; the second end of the first cut edge is connected to a side wall of the first bent slot extending along a circumferential direction of the rotor body.

In an embodiment, the second permanent magnet slot group further includes: a second bent slot, a first end of the second bent slot being in communication with a first end of the second inner layer of permanent magnet slot; the first bent slot being disposed adjacent to the second bent slot; a second end of the second bent slot extending toward the outer edge of the rotor body; the second bent slot having a second cut edge; a first end of the second cut edge being connected to a side wall of the second inner layer of permanent magnet slot adjacent to the second outer layer of permanent magnet slot; a second end of the second cut edge being arranged to extend toward the outer edge of the rotor body and gradually away from the second outer layer of permanent magnet slot; the second end of the second cut edge being connected to a side wall of the second bent slot extending along the circumferential direction of the rotor body; a distance between the second end of the first cut edge and the second end of the second cut edge being LA, a width of the stator tooth boot being LC, and LA≤LC.

In an embodiment, the first permanent magnet slot group further includes: a third bent slot, a first end of the first bent slot being in communication with a second end of the first inner layer of permanent magnet slot; a second end of the third bent slot extending toward the outer edge of the rotor body; the third bent slot and the first bent slot being disposed symmetrically with respect to a direct axis of the first permanent magnet slot group; a first angle being formed between a geometric center line of the first bent slot or the third bent slot and a geometric center line of the first inner layer of permanent magnet slot in a length direction.

In an embodiment, the second permanent magnet slot group further includes: a fourth bent slot, a first end of the fourth bent slot being in communication with a second end of the second inner layer of permanent magnet slot; a second end of the fourth bent slot extending toward the outer edge of the rotor body; the fourth bent slot and the second bent slot being disposed symmetrically with respect to a direct axis of the second permanent magnet slot group; a second angle being formed between a geometric center line of the second bent slot or the fourth bent slot and a geometric center line of the second inner layer of permanent magnet slot in a length direction.

In an embodiment, the first permanent magnet slot group further includes: a fifth bent slot, a first end of the fifth bent slot being in communication with a first end of the first outer layer of permanent magnet slot; a second end of the fifth bent slot extending toward the outer edge of the rotor body; and the fifth bent slot being disposed adjacent to the first bent slot.

In an embodiment, the second permanent magnet slot group further includes: a sixth bent slot, a first end of the sixth bent slot being in communication with a first end of the second outer layer of permanent magnet slot; a second end of the sixth bent slot extending toward the outer edge of the rotor body; the sixth bent slot being disposed adjacent to the second bent slot; and a rotating shaft hole angle formed between a connection line which is formed between an end portion of a side wall of the fifth bent slot adjacent to the direct axis of the first permanent magnet slot group and a rotating shaft hole of the rotor body, and a connection line which is formed between an end portion of a side wall of the sixth bent slot adjacent to the direct axis of the second permanent magnet slot group and the rotating shaft hole of the rotor body being $\theta b$.

In an embodiment, there are a plurality of stator teeth, and the plurality of stator teeth are evenly arranged along an inner circumference surface of a stator body of the stator portion; the plurality of stator portions includes a first stator tooth, a second stator tooth, and a third stator tooth arranged in sequence; a rotating shaft hole angle formed between a connection line which is formed between a point on an end portion of a stator tooth boot of the first stator tooth away from the second stator tooth and the rotating shaft hole of the rotor body, and a connection line which is formed between a point on an end portion of a stator tooth boot of the third stator tooth away from the second stator tooth and the rotating shaft hole of the rotor body is $\theta c$, and $\theta b \leq \theta c$.

In an embodiment, a pole arc corresponding to any two adjacent stator teeth is $\theta c1$, and $\theta b \leq \theta c1$.

In an embodiment, an end portion of the outer layer of permanent magnet slot and an end portion of the inner layer of permanent magnet slot are both disposed toward the outer edge of the rotor body, and magnetic isolation bridges having an equal width are formed between the outer layer of permanent magnet slot and the outer edge of the rotor body, and between the inner layer of permanent magnet slot and the outer edge of the rotor body.

In an embodiment, a distance from an end portion of the first outer layer of permanent magnet slot to the outer edge of the rotor body is H, a width of the end portion of the first outer layer of permanent magnet slot is M, and a width of the magnetic isolation bridge is H1, and $0.4 \times M \leq (H-H1) \leq 2 \times M$.

According to another aspect of the present disclosure, an electric vehicle including a permanent magnet auxiliary synchronous reluctance motor is provided, and the permanent magnet auxiliary synchronous reluctance motor is the above-mentioned permanent magnet auxiliary synchronous reluctance motor.

By applying technical solutions of the present disclosure, the distance between the end portions of the adjacent permanent magnet slot groups is set to be less than or equal to the width of the stator tooth boot of the stator tooth. Accordingly, obstructions of the end portions of the permanent magnet slot groups to the magnetic flux of the stator can be reduced effectively, a minimum torque in an instantaneous torque can be increased, and a torque ripple of the motor can be reduced, thereby reducing a noise of the motor, and improving the efficiency of the motor.

BRIEF DESCRIPTION OF THE DRAWINGS

Accompanying drawings forming a part of the present disclosure are used for providing a further understanding of the present invention. Exemplary embodiments of the present invention and the descriptions thereof are used for explaining the present disclosure and do not constitute an improper limitation on the present disclosure. In the drawings.

Figure 1:
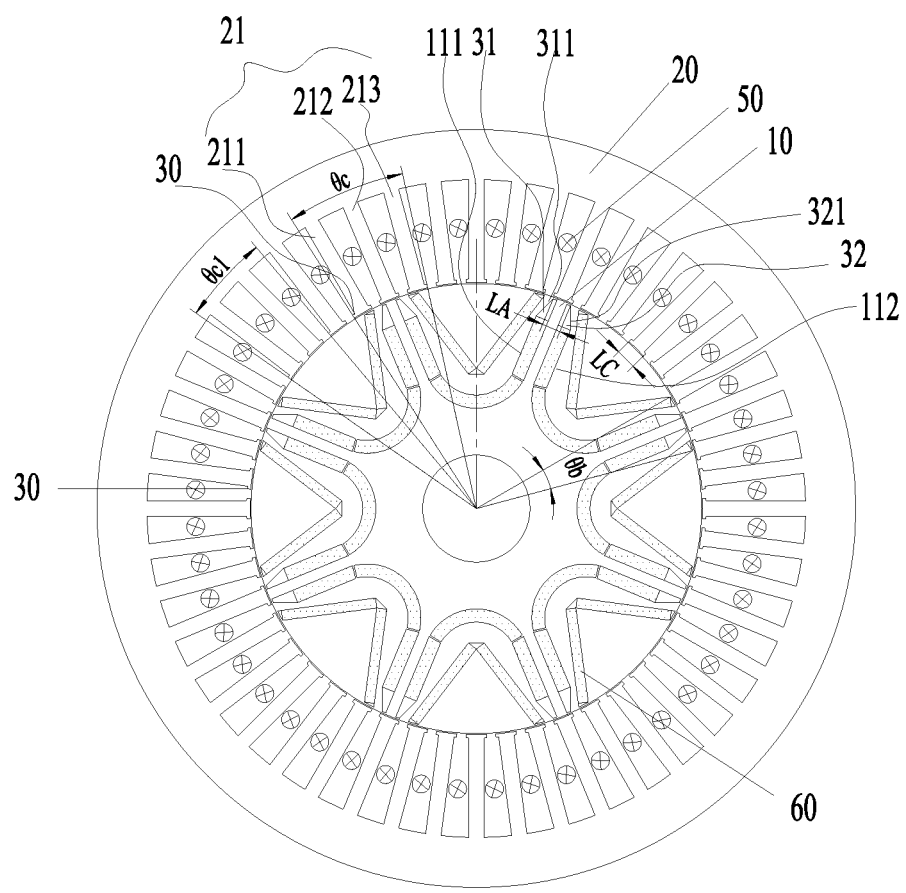
FIG. 1 is a schematic cross-sectional structure diagram of a rotor structure according to an embodiment I of the present disclosure.

The above drawings include the following reference signs:

10, rotor portion; 11, inner layer of permanent magnet slot; 111, first inner layer of permanent magnet slot; 112, second inner layer of permanent magnet slot; 12, outer layer of permanent magnet slot; 121, first outer layer of permanent magnet slot; 122, second outer layer of permanent magnet slot; 13, first magnetic conduction channel; 14, second magnetic conduction channel;

20, stator portion; 21, stator tooth; 211, first stator tooth; 212, second stator tooth; 213, third stator tooth;

30, stator tooth boot;

31, first bent slot; 32, second bent slot; 33, third bent slot; 34, fourth bent slot; 35, fifth bent slot; 36, sixth bent slot;

40, magnetic isolation bridge;

50, winding;

60, permanent magnet.

DETAILED DESCRIPTION OF THE EMBODIMENTS

It should be noted that embodiments in the present disclosure and features in the embodiments can be combined with each other if there is no conflict. The present disclosure will be described in detail below with reference to the accompanying drawings and in conjunction with the embodiments.

With reference to FIGS. 1 to 5 and FIGS. 7 to 17, according to an embodiment of the present disclosure, a permanent magnet auxiliary synchronous reluctance motor is provided. Specifically, the permanent magnet auxiliary synchronous reluctance motor includes a stator portion 20 and a rotor portion 10. The stator portion 20 includes a stator core and a winding 50 embedded in the stator core, and the stator core is provided with a stator tooth 21 and a stator slot. The rotor portion 10 is provided inside the stator portion 20. A rotor body of the rotor portion 10 is provided with a permanent magnet slot group. There are a plurality of permanent magnet slot groups. The plurality of permanent magnet slot groups are evenly arranged along a circumferential direction of the rotor body. Each of the permanent magnet slot groups is provided with multiple layers of permanent magnet slots. A distance between an end portion of a permanent magnet slot of a permanent magnet slot group and an end portion of an adjacent permanent magnet slot of an adjacent permanent magnet slot group is less than or equal to a width of a stator tooth boot 30 of the stator tooth 21, and the number of slots per pole and per phase of the motor is two or three.

In the present embodiment, by setting the distance between the end portions between the adjacent permanent magnet slot groups to be less than or equal to the width of the stator tooth boot of the stator tooth. In this way, it is possible to effectively reduce obstructions of the ends between the permanent magnet slots groups to a magnetic flux of the stator, increase a minimum torque in an instantaneous torque, and reduce a torque ripple of the motor, thereby reducing a noise of the motor.

In the present embodiment, the permanent magnet slot group includes an outer layer of permanent magnet slot 12 and an inner layer of permanent magnet slot 11. A magnetic conduction channel is formed between the outer layer of permanent magnet slot 12 and the inner layer of permanent magnet slot 11. The inner layer of permanent magnet slots of two adjacent permanent magnet slot groups are arranged adjacently. A width between end portions of the adjacent inner layer of permanent magnet slots is less than or equal to a width of the stator tooth 21. In this way, it is possible to effectively reduce the obstructions of the end portions between the permanent magnet slots groups to the magnetic flux of the stator, increase the minimum torque in the instantaneous torque, and reduce the torque ripple of the motor, thereby reducing the noise of the motor.

Figure 2:
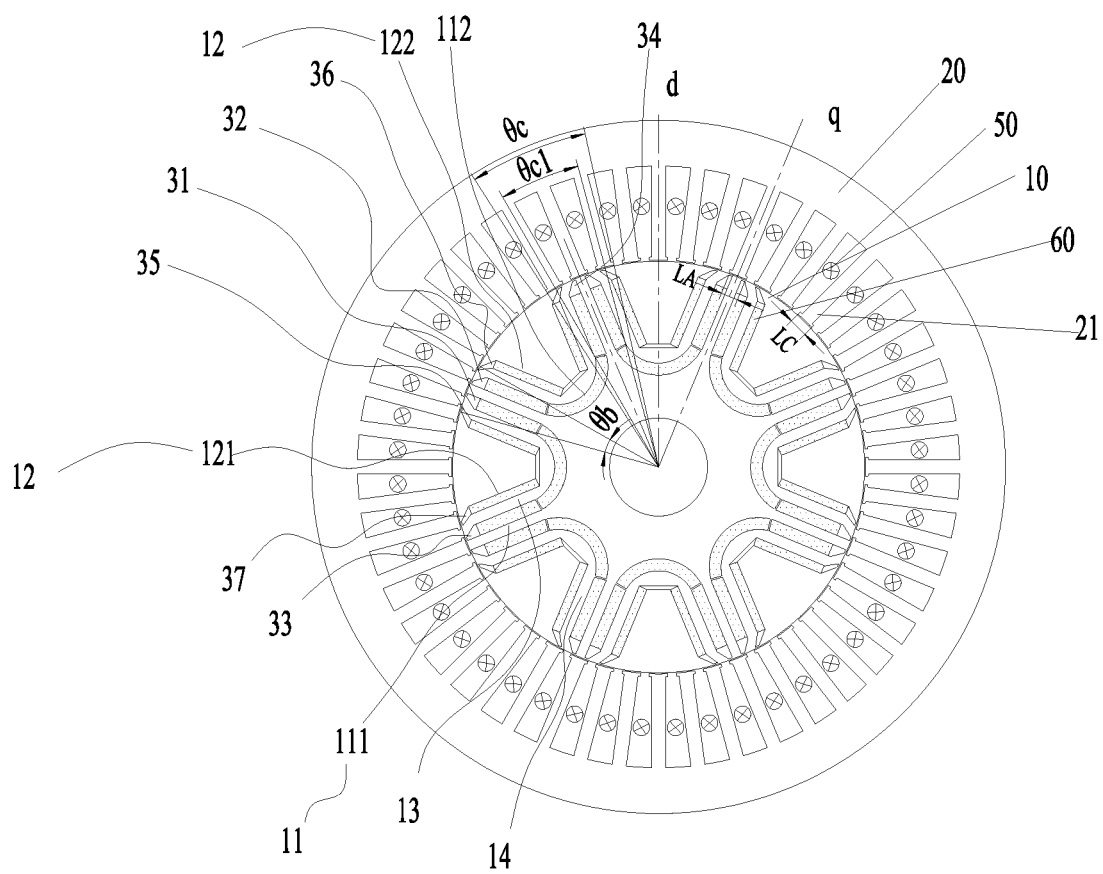
FIG. 2 is a schematic cross-sectional structure diagram of a rotor structure according to an embodiment II of the present disclosure.
Figure 3:
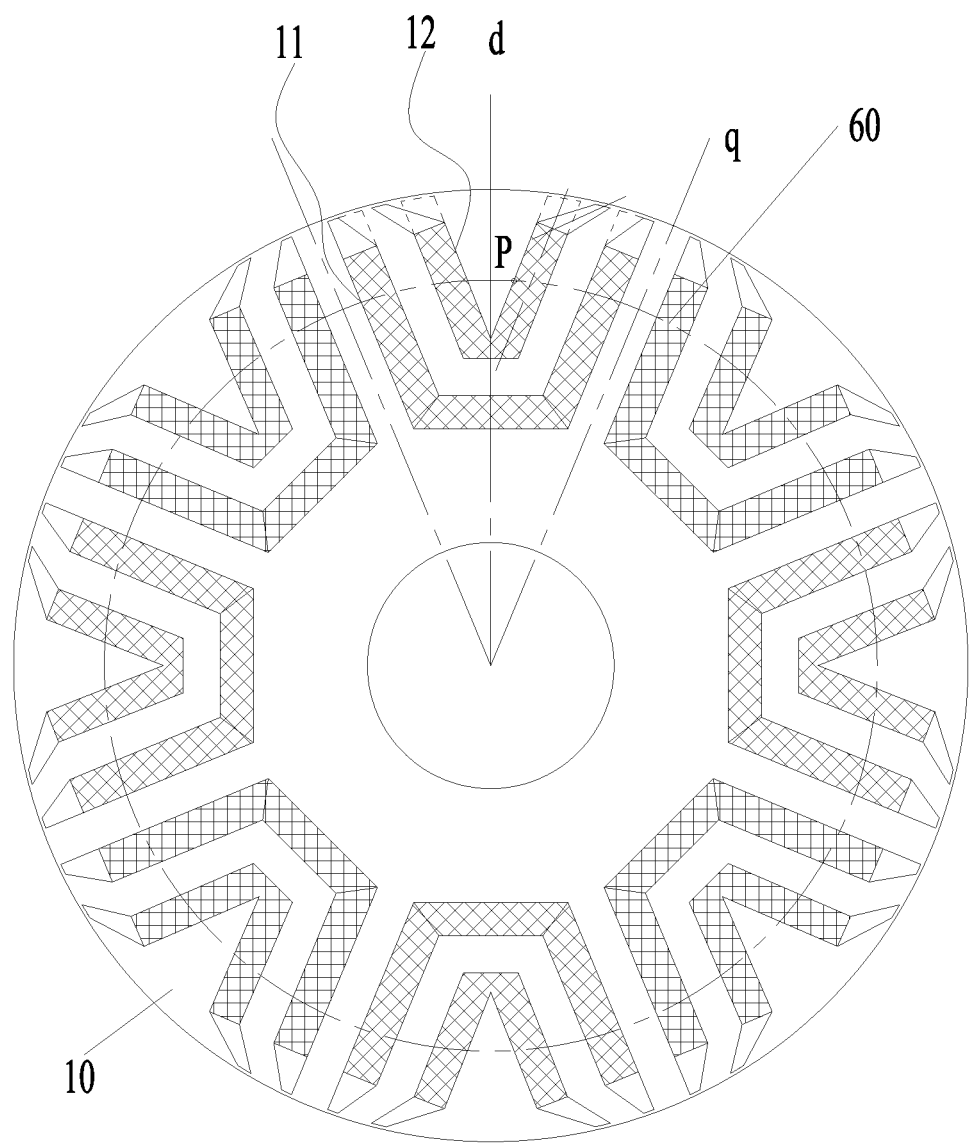
FIG. 3 is a schematic cross-sectional structure diagram of a rotor structure according to an embodiment III of the present disclosure.

As shown in FIGS. 1 and 2, the plurality of permanent magnet slot groups include a first permanent magnet slot group and a second permanent magnet slot group. The first permanent magnet slot group includes a first inner layer of permanent magnet slot 111 and a first outer layer of permanent magnet slot 121, and a first magnetic conduction channel 13 is formed between the first inner layer of permanent magnet slot 111 and the first outer layer of permanent magnet slot 121. The second permanent magnet slot group includes a second inner layer of permanent magnet slot 112 and a second outer layer of permanent magnet slot 122, and a second magnetic conduction channel 14 is formed between the second inner layer of permanent magnet slot 112 and the second outer layer of permanent magnet slot 122. A third magnetic conduction channel is formed between a portion of the first inner layer of permanent magnet slot 111 and a portion of the second outer layer of permanent magnet slot 122. In such an arrangement, a magnetic field line can be better guided into each magnetic conduction channel effectively.

Further, the first permanent magnet slot group further includes a first bent slot 31. A first end of the first bent slot 31 is in communication with a first end of the first inner layer of permanent magnet slot 111. A second end of the first bent slot 31 extends toward an outer edge of the rotor body. The first bent slot 31 has a first cut edge 311. A first end of the first cut edge 311 is connected to a side wall of the first inner layer of permanent magnet slot 111 adjacent to the first outer layer of permanent magnet slot 121. A second end of the first cut edge 311 is arranged to extend toward the outer edge of the rotor body and gradually away from the first outer layer of permanent magnet slot 121. The second end of the first cut edge 311 is connected to a side wall of the first bent slot 31 extending along the circumferential direction of the rotor body. In such an arrangement, a distribution of the magnetic field lines of each magnetic conduction channel can be further adjusted to reduce local saturation. All rotor poles are evenly distributed on a circumference.

In addition, the second permanent magnet slot group further includes a second bent slot 32. A first end of the second bent slot 32 is in communication with a first end of the second inner layer of permanent magnet slot 112. The first bent slot 31 is disposed adjacent to the second bent slot 32. A second end of the second bent slot 32 extends toward the outer edge of the rotor body. The second bent slot 32 has a second cut edge 321. A first end of the second cut edge 321 is connected to a side wall of the second inner layer of permanent magnet slot 112 adjacent to the second outer layer of permanent magnet slot 122. A second end of the second cut edge 321 is arranged to extend toward the outer edge of the rotor body and gradually away from the second outer layer of permanent magnet slot 122. The second end of the second cut edge 321 is connected to a side wall of the second bent slot 32 extending along the circumferential direction of the rotor body. A distance between the second end of the first cut edge 311 and the second end of the second cut edge 321 is LA, and a width of the stator tooth boot 30 is LC, and LA≤LC. In such an arrangement, it is possible to effectively reduce the obstructions of the end portions between the permanent magnet slot groups to the magnetic flux of the stator, increase the minimum torque in the instantaneous torque, and reduce the torque ripple of the motor, thereby reducing the noise of the motor.

As shown in FIG. 2, the first permanent magnet slot group further includes a third bent slot 33. A first end of the first bent slot 31 is in communication with a second end of the first inner layer of permanent magnet slot 111. A second end of the third bent slot 33 extends toward the outer edge of the rotor body. The third bent slot 33 and the first bent slot 31 are disposed symmetrically with respect to a direct axis of the first permanent magnet slot group (as shown in FIG. 2, the direct axis is the d-axis in the figure, and a quadrature axis is the q-axis in the figure). A first angle is formed between a geometric center line of the first bent slot 31 or the third bent slot 33 and a geometric center line of the first inner layer of permanent magnet slot 111 in a length direction. In such an arrangement, an efficient introduction of the magnetic field lines in the magnetic conduction channel is facilitated.

The second permanent magnet slot group further includes a fourth bent slot 34. A first end of the fourth bent slot 34 is in communication with a second end of the second inner layer of permanent magnet slot 112. A second end of the fourth bent slot 34 extends toward the outer edge of the rotor body. The fourth bent slot 34 and the second bent slot 32 are disposed symmetrically with respect to a direct axis of the second permanent magnet slot group. A second angle is formed between a geometric center line of the second bent slot 32 or the fourth bent slot 34 and a geometric center line of the second inner layer of permanent magnet slot 112 in the length direction. In such an arrangement, an efficient introduction of the magnetic field lines in the magnetic conduction channel is facilitated.

In the present embodiment, the first permanent magnet slot group further includes a fifth bent slot 35. A first end of the fifth bent slot 35 is in communication with a first end of the first outer layer of permanent magnet slot 121. A second end of the fifth bent slot 35 extends toward the outer edge of the rotor body. The fifth bent slot 35 is disposed adjacent to the first bent slot 31. In such an arrangement, an efficient introduction of the magnetic field line in the magnetic conduction channel is facilitated.

In the present embodiment, the second permanent magnet slot group further includes a sixth bent slot 36. A first end of the sixth bent slot 36 is in communication with a first end of the second outer layer of permanent magnet slot 122. A second end of the sixth bent slot 36 extends toward the outer edge of the rotor body. The sixth bent slot 36 is disposed adjacent to the second bent slot. A rotating shaft hole angle between a connection line which is formed between an end portion of a side wall of the fifth bent slot 35 adjacent to the direct axis of the first permanent magnet slot group and a rotating shaft hole of the rotor body, and a connection line which is formed between an end portion of a side wall of the sixth bent slot 36 adjacent to the direct axis of the second permanent magnet slot group and the rotating shaft hole of the rotor body, is θb. In such an arrangement, the magnetic field line of the stator can be better guided into each magnetic conduction channel more evenly.

There are a plurality of stator teeth 21, and the plurality of stator teeth 21 are evenly arranged along an inner circumferential surface of the stator body of the stator portion 20. The plurality of stator portions 20 includes a first stator tooth 211, a second stator tooth 212, and a third stator tooth 213 arranged in sequence. A rotating shaft hole angle between a connection line which is formed between a point on an end portion of a stator tooth boot 30 of the first stator tooth 211 away from the second stator tooth 212 and the rotating shaft hole of the rotor body, and a connection line which is formed between a point on an end portion of a stator tooth boot 30 of the third stator tooth 213 away from the second stator tooth 212 and the rotating shaft hole of the rotor body, is θc, and θb≤θc. In such an arrangement, it is possible to reduce the obstruction of the end portion of the rotor magnetic channel to the magnetic field line of the stator, increase the minimum torque of the instantaneous torque, and reduce the torque ripple of the motor.

In the present embodiment, a pole arc corresponding to any two adjacent stator teeth 21 is θc1, and θb≤θc1. In such an arrangement, it is possible to better guide the magnetic field line of the stator into each magnetic conduction channel more evenly.

Figure 4:
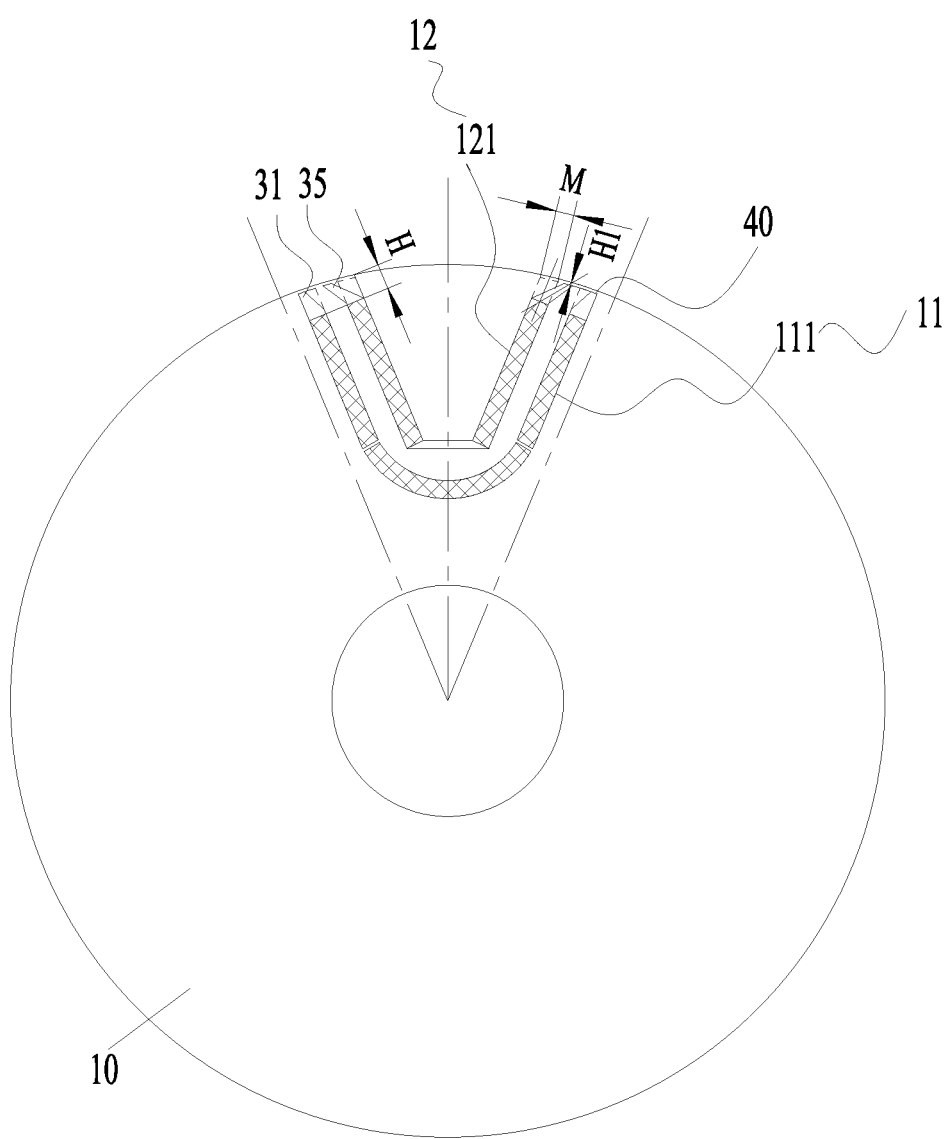
FIG. 4 is a schematic cross-sectional structure diagram of a rotor structure according to an embodiment IV of the present disclosure.

As shown in FIG. 4, an end portion of the outer layer of permanent magnet slot and an end portion of the inner layer of permanent magnet slot are both disposed toward the outer edge of the rotor body, and magnetic isolation bridges 40 of an equal width are formed between the outer layer of permanent magnet slot and the outer edge of the rotor body, and between the inner layer of permanent magnet slot and the outer edge of the rotor body. In such an arrangement, a guiding effect of the magnetic field line can be made better, and a larger q-axis inductance can be obtained.

A distance from an end portion of the first outer layer of permanent magnet slot 121 to the outer edge of the rotor body is H, a width of the end portion of the first outer layer of permanent magnet slot 121 is M, and a width of the magnetic isolation bridge 40 is H1, and 0.4×M≤(H−H1)≤2×M. In such an arrangement, a guiding effect of the magnetic field line can be made better, and a larger q-axis inductance can be obtained.

The motor structure in the above embodiments can also be applied to the technical field of vehicle equipment. That is, according to another aspect of the present disclosure, an electric vehicle including a permanent magnet auxiliary synchronous reluctance motor is provided. The permanent magnet auxiliary synchronous reluctance motor is the permanent magnet auxiliary synchronous reluctance motor according to any of the above embodiments.

In the present embodiment, the motor includes the stator portion 20 and the rotor portion 10. The stator includes the stator core and the winding 50 embedded in the stator core. The rotor includes the permanent magnet slot and the permanent magnet 60 placed in the slot. The rotor includes two layers of permanent magnets on the same magnetic pole, which can make the motor obtain a larger reluctance torque and have a strong anti-demagnetization ability. The permanent magnets 60 on the same magnetic pole have the same polarity toward the stator. The permanent magnet slot has a shape protruding toward an inner side of the rotor. Two ends of the permanent magnet slot are adjacent to an outer edge of the rotor, and a center of the permanent magnet slot is adjacent to the inner side of the rotor. The number (Q/m/2P) of the slots of the motor per pole and per phrase is 2 or 3, which can effectively reduce a harmonic content of the magnetic field of the stator and obtain a better winding embedding process. A distance LA between two outer vertices of the two ends of the two adjacent innermost layers of permanent magnet slots of the rotor is no greater than the width LC of the stator tooth boot. By setting the width between the ends of the two adjacent inner layers of permanent magnet slots of the rotor to be no greater than the width of the stator tooth boot, it is possible to effectively reduce the obstructions of the ends of the permanent magnet slot to the magnetic flux of the stator, increase a minimum torque in an instantaneous torque, and reduce the torque ripple of the motor, thereby reducing the noise of the motor.

As shown in FIG. 2, the angle θb formed by the outer vertices of the ends of the outer layers of permanent magnet slots of the two adjacent magnetic poles of the rotor and a center of the rotor is no greater than the angle θc formed by the outer vertices of the two stator teeth separated by a stator tooth of the stator and the center of the rotor. In such an arrangement, it is possible to reduce the obstruction of the end of the rotor magnetic channel to the magnetic field line of the stator, increase the minimum torque in the instantaneous torque, and reduce the torque ripple of the motor.

Further, the angle θb formed by the outer vertices of the ends of the outer layers of permanent magnet slots of the two adjacent magnetic poles of the rotor and the center of the rotor is no greater than a pole arc angle θc1 corresponding to two stator teeth. In such configuration, not only the torque ripple of the motor can be reduced, but also the q-axis inductance of the motor can be increased and the reluctance torque of the motor can be increased.

Further, in order to achieve a better improvement effect of the torque, magnetic isolation bridges having an approximately equal thickness are formed between an end edge line of the inner layer of permanent magnet slot of the rotor and the outer edge of the rotor, and between an end edge line of the outer layer of permanent magnet slot of the rotor and the outer edge of the rotor, which can reduce a magnetic leakage at the end of the permanent magnet 60.

A study finds that when three-phase symmetrical alternating current is fed to the stator portion 20 of the motor, the magnetic field lines are not distributed evenly on each tooth of the stator portion 20. In the position closer to a boundary line, there are more magnetic field lines distributed on the teeth of the stator portion 20.

Figure 6:
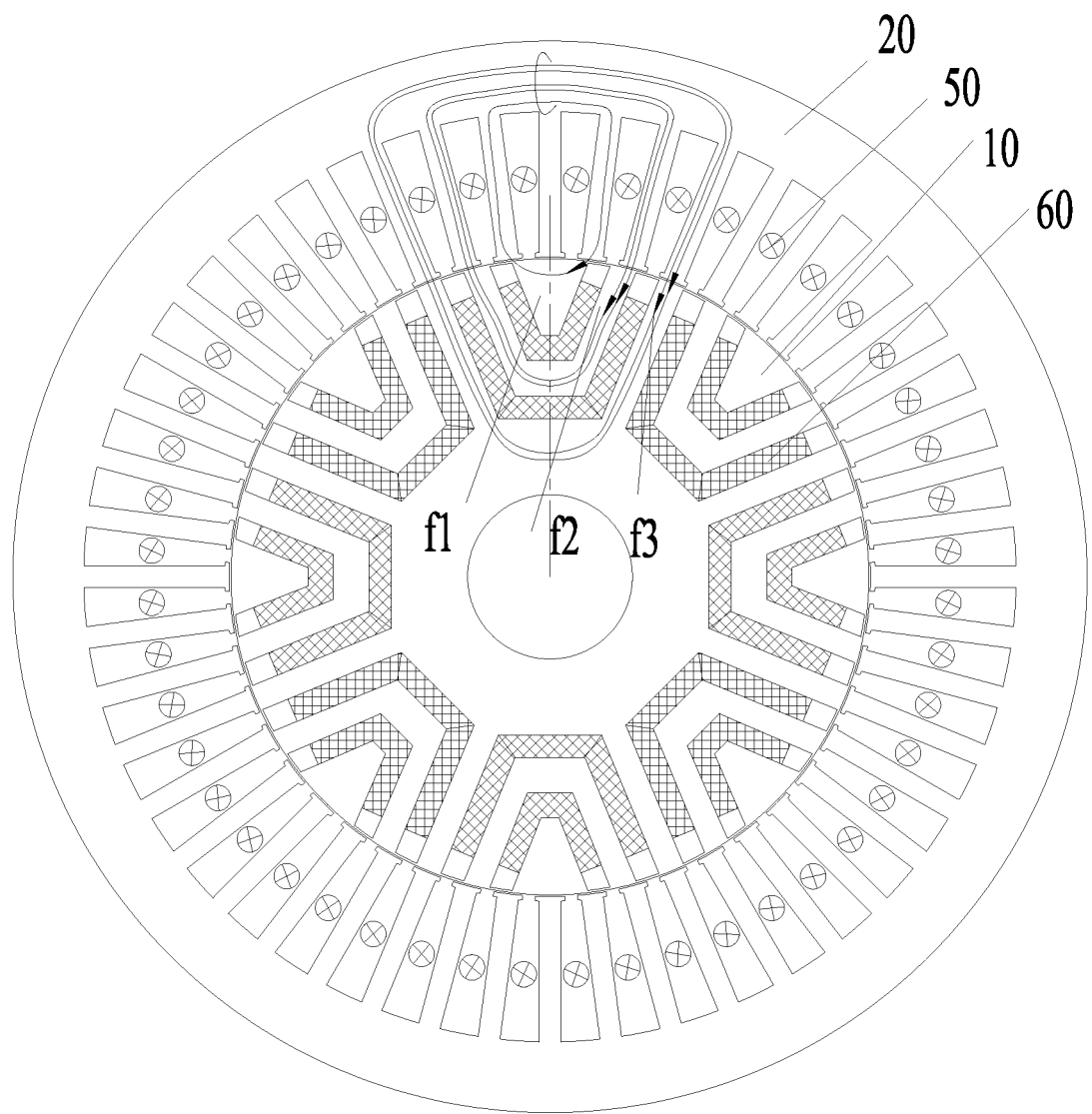
FIG. 6 is a schematic diagram showing a walk path of a q-axis magnetic field line of a rotor structure according to an embodiment of the present disclosure.
Figure 7:
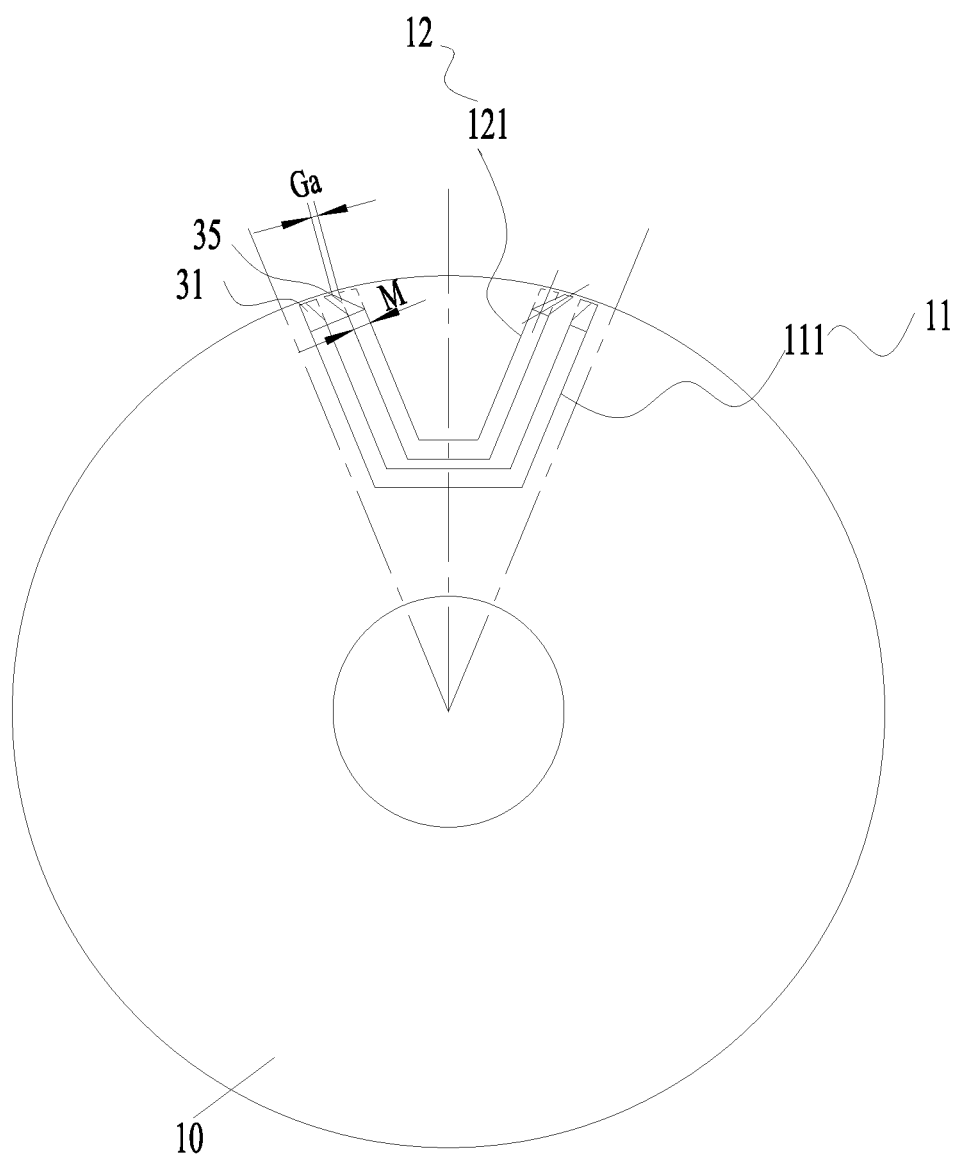
FIG. 7 is a schematic cross-sectional structure diagram of a rotor structure according to an embodiment VI of the present disclosure.
Figure 8:
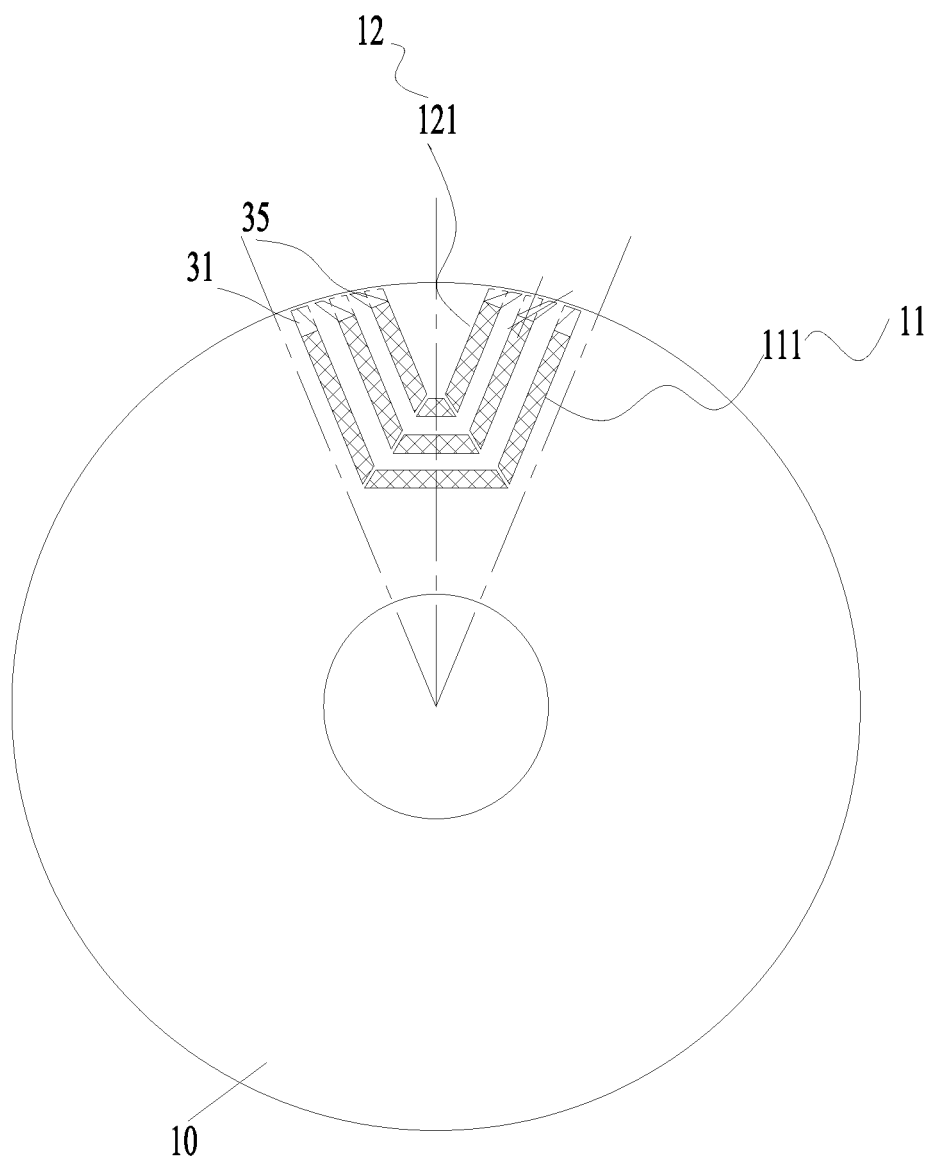
FIG. 8 is a schematic cross-sectional structure diagram of a rotor structure according to an embodiment VII of the present disclosure.
Figure 9:
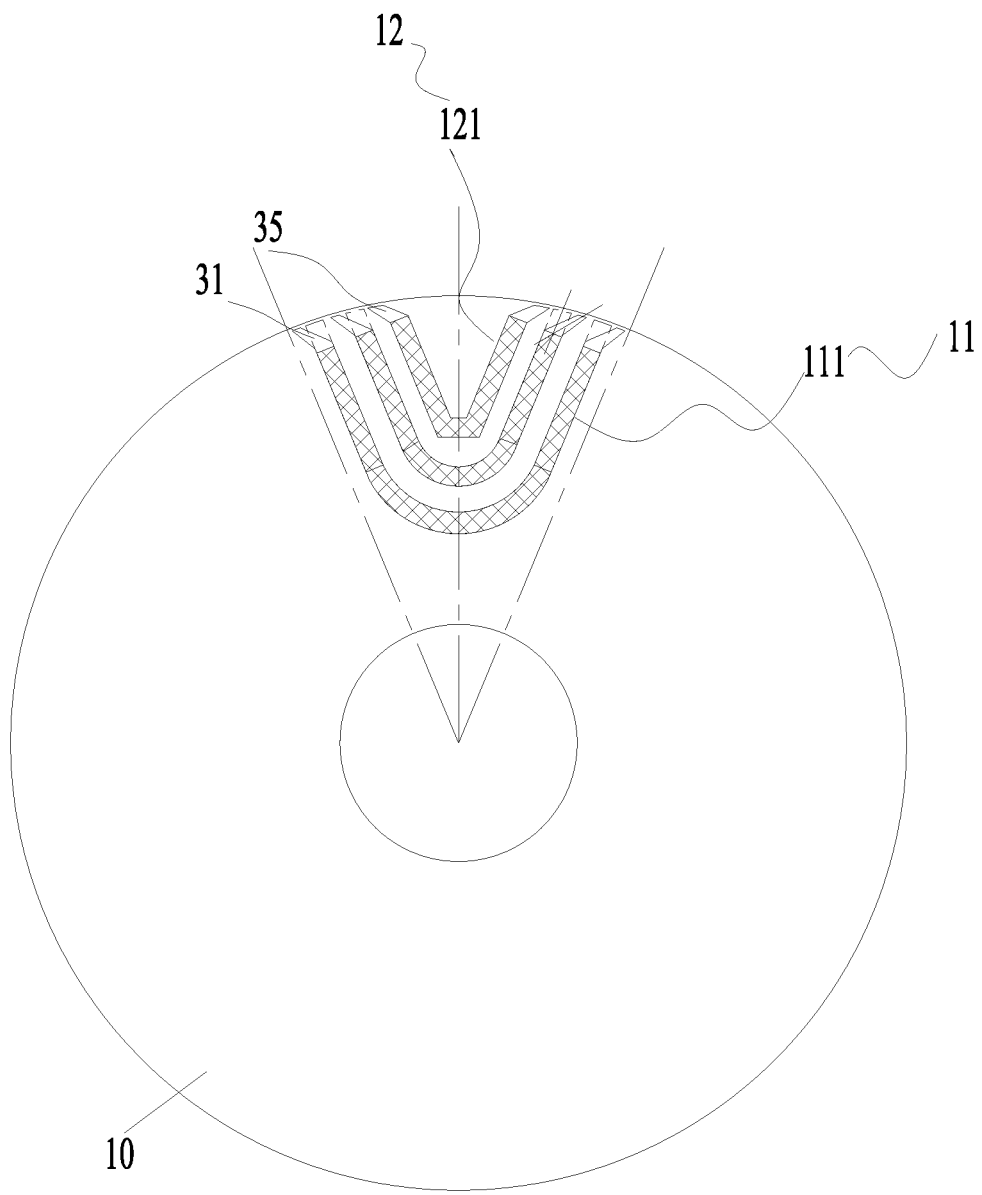
FIG. 9 is a schematic cross-sectional structure diagram of a rotor structure according to an embodiment VIII of the present disclosure.
Figure 13:
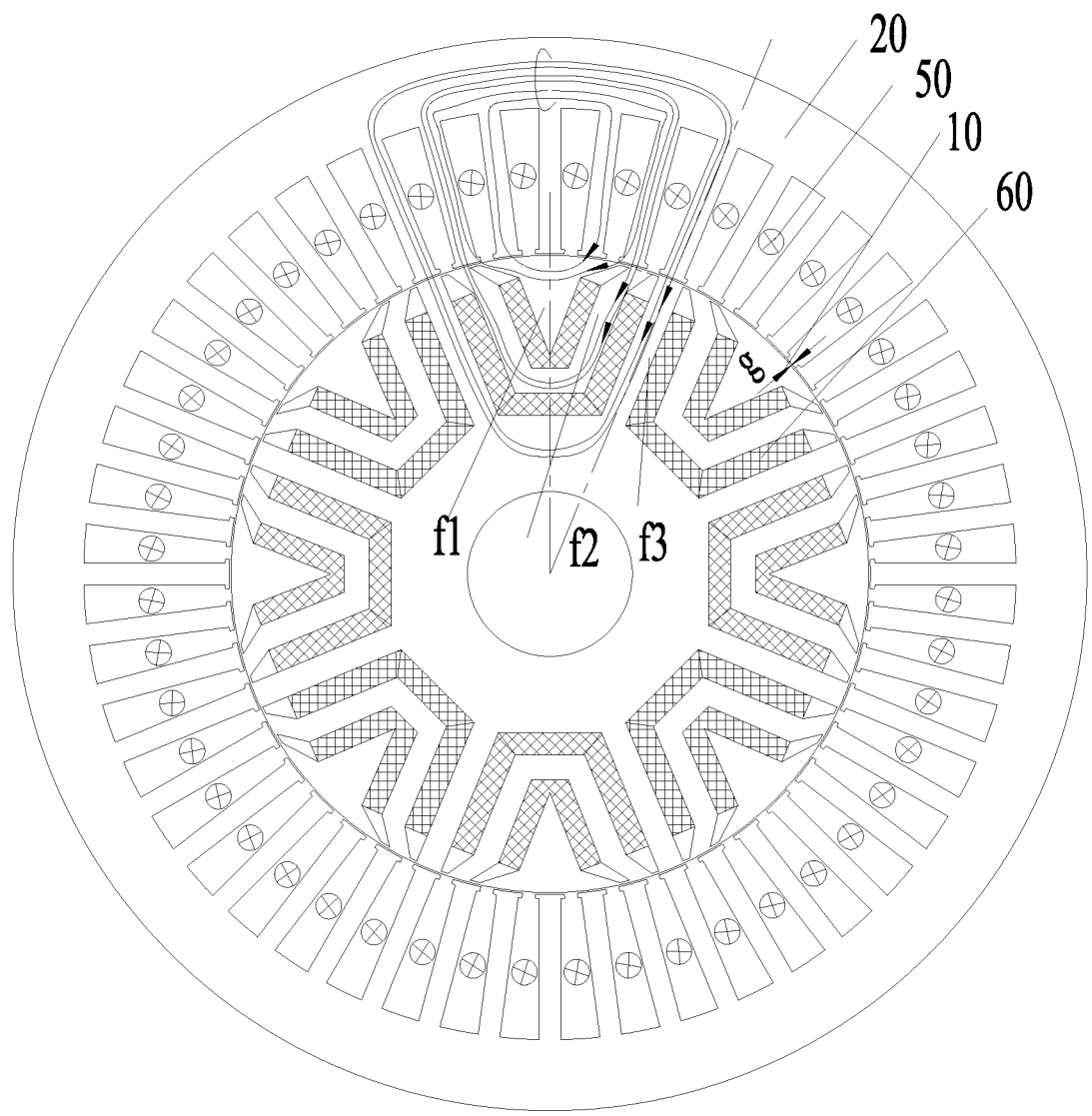
FIG. 13 is a schematic diagram of a walk path of a q-axis magnetic field line of a rotor structure according to an embodiment XII of the present disclosure.
Figure 14:
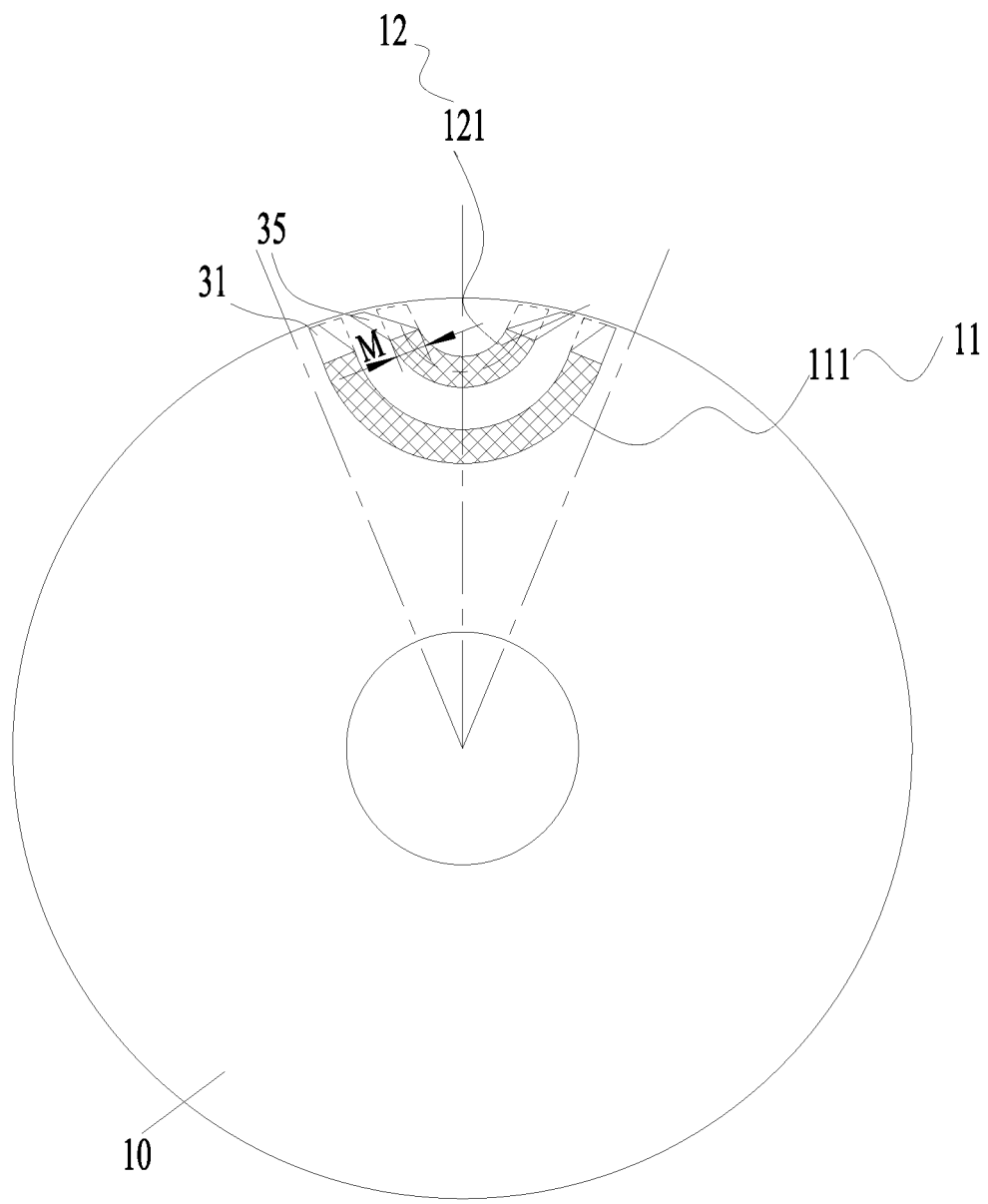
FIG. 14 is a schematic cross-sectional structure diagram of a rotor structure according to an embodiment of the present disclosure.

As shown in FIG. 6, a q-axis flux linkage line enters three magnetic conduction channels of the rotor from the stator teeth. The magnetic conduction channel f3 is formed between the innermost layers of permanent magnet slots of two adjacent magnetic poles; the magnetic conduction channel f2 is formed between the innermost layer of permanent magnet slot and the second layer of permanent magnet slot; and the magnetic conduction channel f1 is formed by a magnetic conduction region from the second layer of permanent magnet slot to the outer edge of the rotor. Because of the unevenly distributed magnetic field lines on the stator teeth, the number of magnetic field lines entering the magnetic conduction channel f3 is the most, and the number of the magnetic field lines entering the magnetic conduction channel f1 is the least. The magnetic circuits of the magnetic conduction channel f3 and the magnetic conduction channel f2 are relatively saturated. When a load of the motor is heavier, the q-axis inductance of the motor is decreased greatly, which affects the utilization of the reluctance torque of the motor. In particular, for a permanent magnet auxiliary synchronous reluctance motor using a ferrite, in order to improve the efficiency and anti-demagnetization ability of the motor, the permanent magnet 60 is relatively thick, and the width of the magnetic conduction channel is difficult to increase, this phenomenon becomes more serious. For this reason, the present solution provides a turn at the end of the magnetic conduction channel deflecting toward the inner layer of permanent magnet 60. The schematic distribution diagram of the q-axis magnetic field line f of the motor is shown in FIG. 13. By setting a turn at the end of the magnetic conduction channel deflecting toward the end of the inner layer of permanent magnet slot, the direction of the q-axis magnetic field line f of the stator can be effectively guided. The magnetic field lines that originally enter a high magnetic saturation region, i.e., the magnetic channel lines entering the magnetic conduction channel f2 as shown in the figure, is changed into entering a low magnetic saturation region, i.e., the magnetic conduction channel f1 as shown in the figure. More magnetic fluxes are generated under the same excitation current, thereby improving the q-axis inductance of the motor, increasing the reluctance torque of the motor, and improving the efficiency and power density of the motor.

Figure 10:
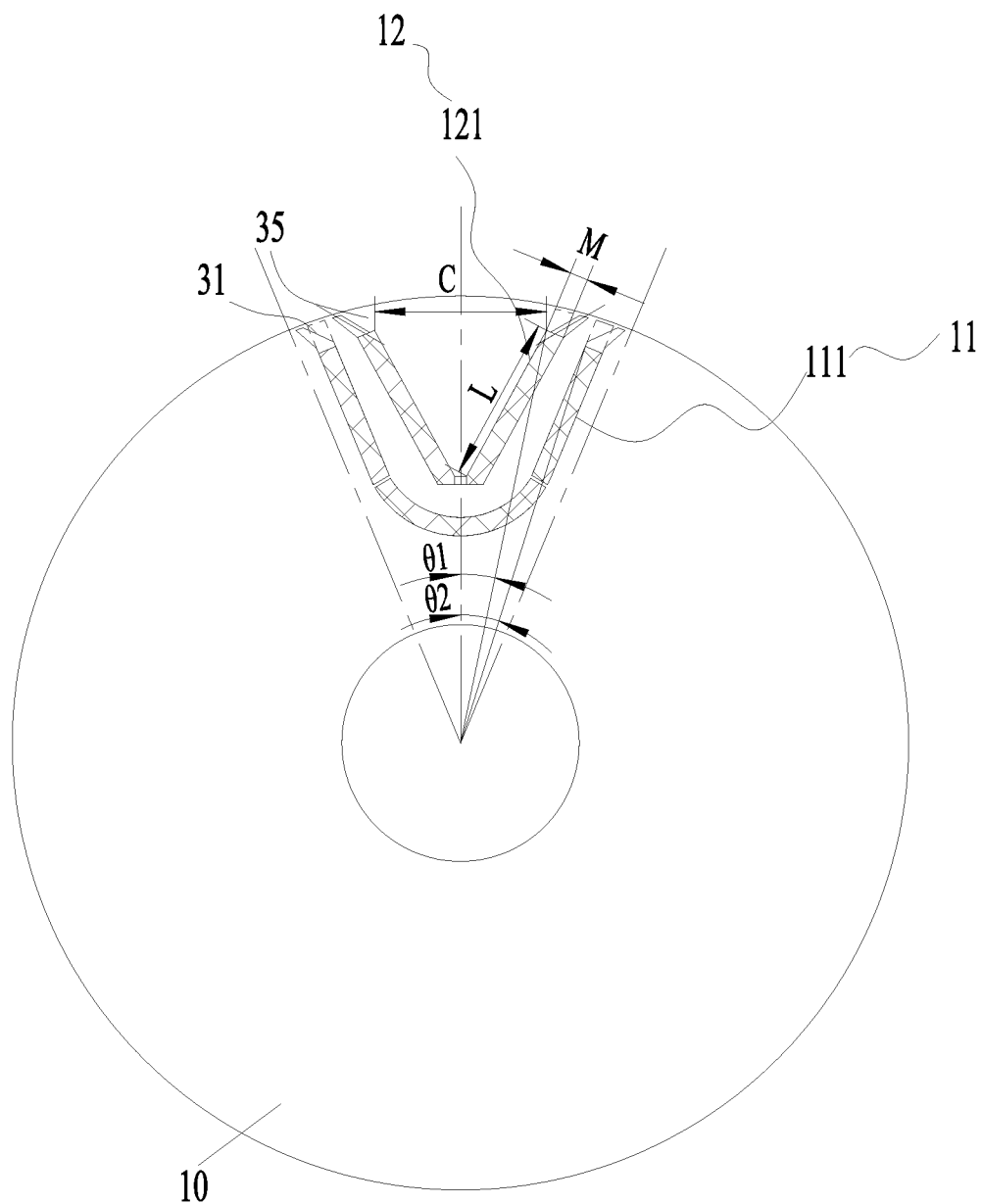
FIG. 10 is a schematic cross-sectional structure diagram of a rotor structure according to an embodiment IX of the present disclosure.
Figure 11:
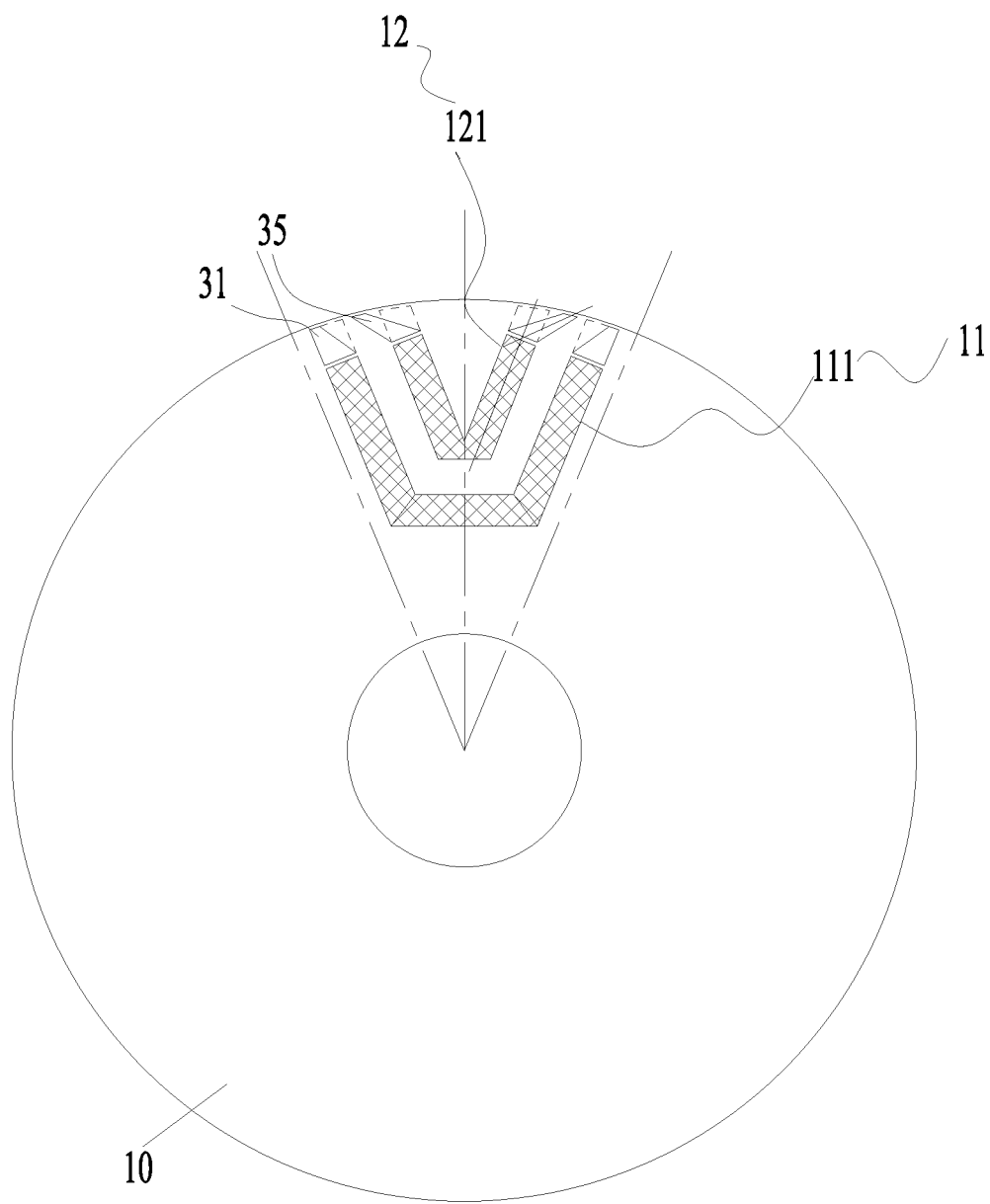
FIG. 11 is a schematic cross-sectional structure diagram of a rotor structure according to an embodiment X of the present disclosure.
Figure 12:
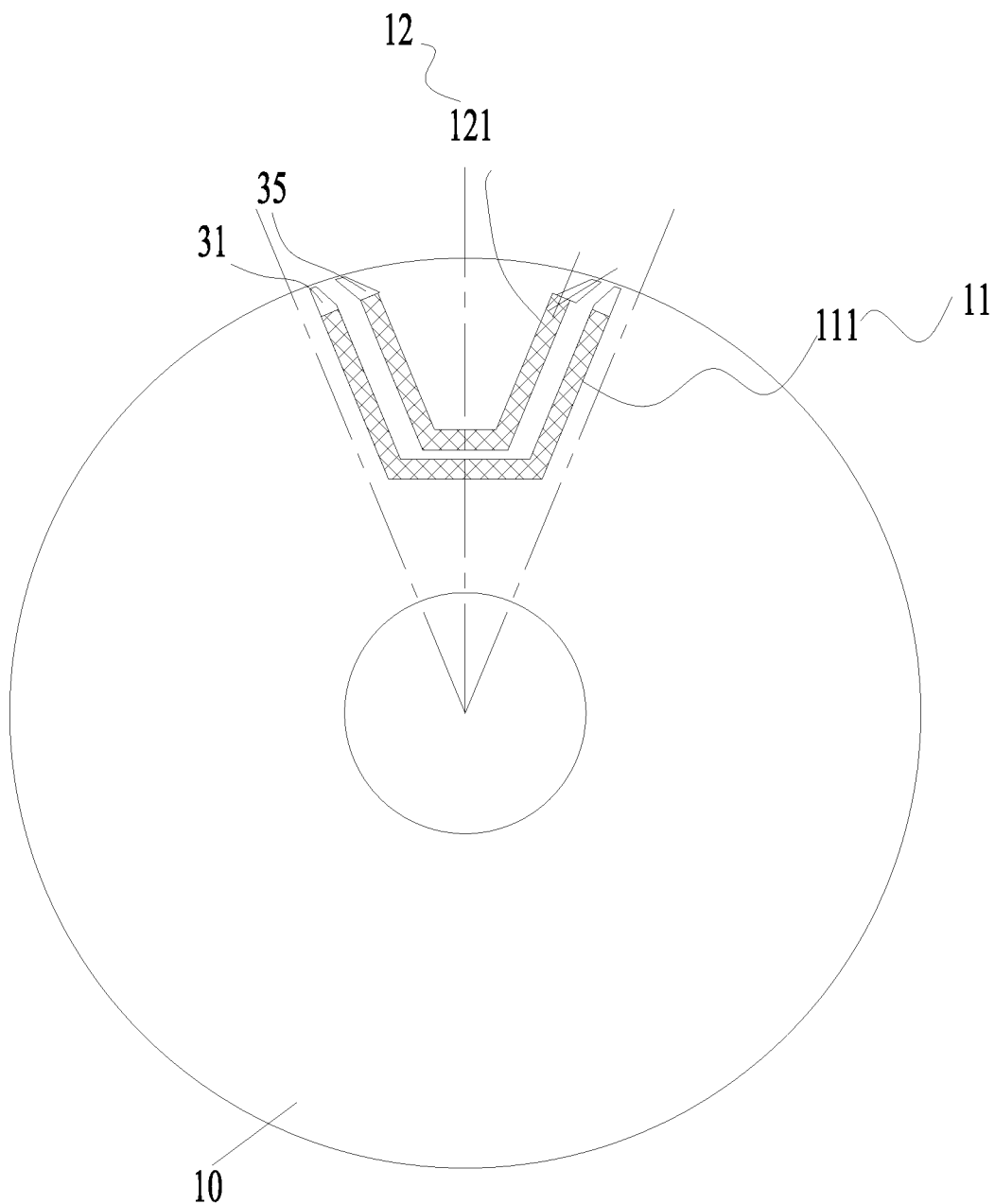
FIG. 12 is a schematic cross-sectional structure diagram of a rotor structure according to an embodiment XI of the present disclosure.

In addition, the innermost layer of permanent magnet of the rotor is taken as a first layer, the end of the second layer of permanent magnet slot calculated from inside to outside has a turn deflecting toward the end of the inner layer of permanent magnet slot, as shown in FIG. 10. Through the deflection of the end of the permanent magnet slot, the magnetic field lines of the stator can be better guided into each of the magnetic conduction channels more evenly.

Further, a width of a bent portion at the end of the permanent magnet slot gradually increases from the outer surface to the inside of the rotor. By setting the width of the bent portion of the permanent magnet slot to be narrow on the outside and wide on the inside. On one hand, it is possible to reduce a decrease of the q-axis magnetic flux caused by a decrease in an width of an inlet of the magnetic conduction channel f2 after the deflection of the permanent magnet slot. On the other hand, the magnetic field lines originally entering the rotor form the magnetic conduction channel f2 can be better guided to become entering the rotor from the magnetic conduction channel f3.

Figure 5:
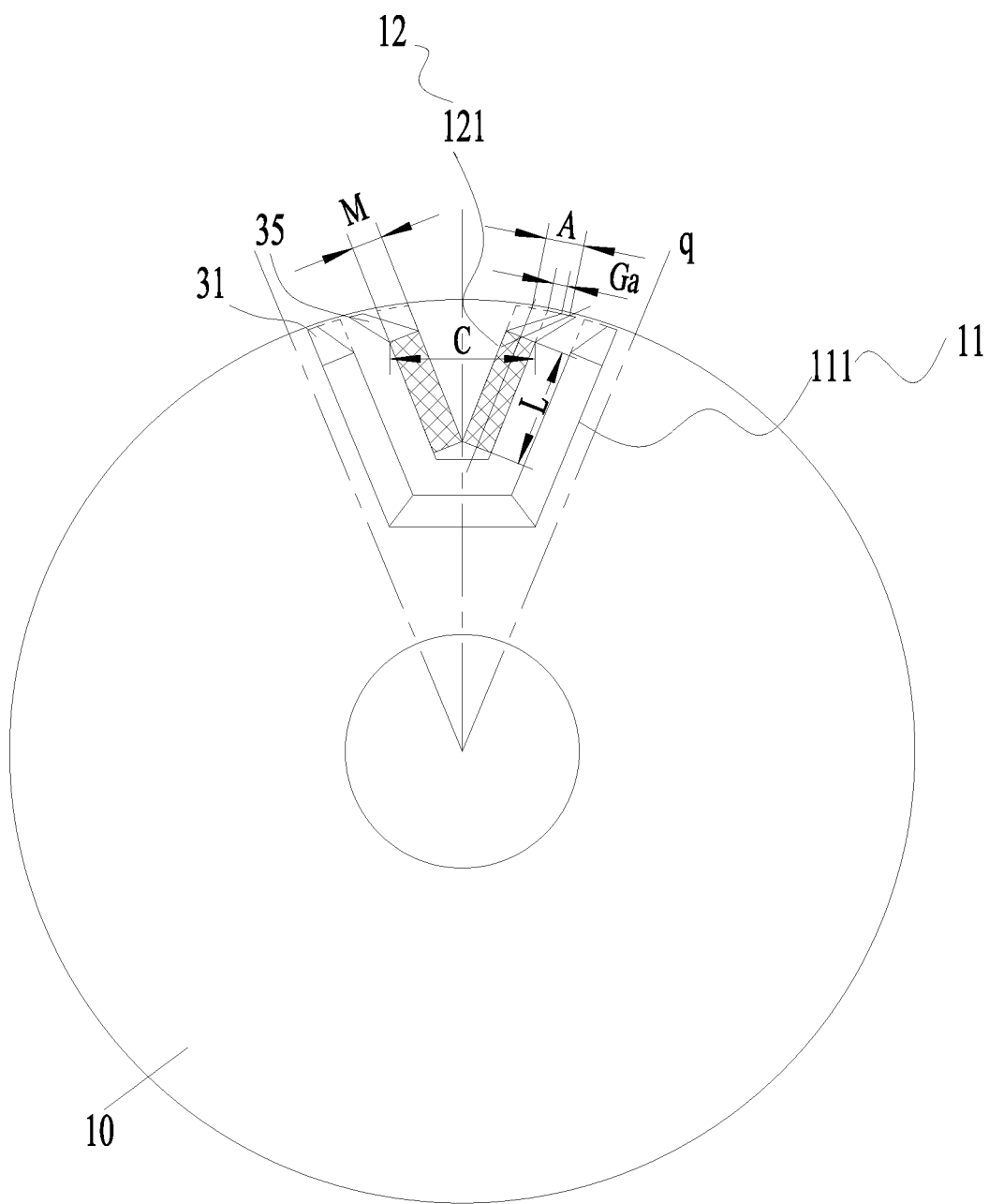
FIG. 5 is a schematic cross-sectional structure diagram of a rotor structure according to an embodiment V of the present disclosure.

As shown in FIG. 5, in order to better guide the magnetic field lines from the magnetic conduction channel with the high magnetic saturation into the magnetic conduction channel with low magnetic saturation, a distance between a midpoint of the end edge line of the second layer of permanent magnet slot after being bent and a midpoint of the end edge line of the second layer of permanent magnet slot before being bent is defined as A, and a width of an unbent portion of the second layer of permanent magnet slot adjacent to the end edge line of the rotor is M, and 0.6M≤A. A shape of the end of the magnetic conduction channel before bent is determined by the following method. When a flat permanent magnet 60 is installed in the permanent magnet slot, two edge lines of the permanent magnet slot are extended, and a distance between the outer edge line of the permanent magnet slot adjacent to the rotor and the outer edge of the rotor is unchanged after the permanent magnet slot is bent; when an arc-shaped permanent magnet 60 is installed in the permanent magnet slot, an arc-shaped tangent line is taken at an end point of the arc-shaped permanent magnet slot, and the tangent line is extended, and a distance between the outer edge line of the permanent magnet slot adjacent to the rotor and the outer edge of the rotor is unchanged after the permanent magnet slot is bent. By controlling an amplitude of the deflection of the end of the permanent magnet slot and setting A to be equal to or greater than 0.6M, the guiding effect of the magnetic field lines can be made better, and a larger q-axis inductance can be obtained.

In the present embodiment, compared to an end point of the end edge line of the second layer of permanent magnet slot adjacent to the inside before being bent, an end point of the end edge line of the second layer of permanent magnet slot adjacent to the outside after being bent is closer to the q-axis of the rotor. Such configuration is to implement a better guiding effect of the magnetic field lines.

Further, a distance between the end point of the end edge line of the second layer of permanent magnet slot adjacent to the outside after being bent and the end point of the end edge line of the second layer of permanent magnet slot adjacent to the inside before being bent is Ga. The distance Ga is substantially equal to an integer multiple of a length g of an air gap of the rotor or the stator. By setting the distance Ga to the integer multiple of the length g of the air gap of the rotor or the stator, it is possible to effectively reduce a harmonic magnetic field content of the air gap and reduce the harmonic loss and torque ripple of the motor. A range here is 0.95 times to 1.05 times.

Further, a length of the bent portion of the end of the second layer of permanent magnet slot is H–H1, and a width of an end of the unbent portion of the permanent magnet slot is M, which satisfies $0.4 \times M \leq (H-H1)$. H denotes a distance from an outer edge line of the bent portion of the permanent magnet slot to the outer edge of the rotor; H1 denotes a thickness of a magnetic bridge formed by a bent portion of the permanent magnet 60 of the rotor and the outer edge of the rotor; and M denotes a width of an end of the unbent portion of the permanent magnet slot.

Figure 15:
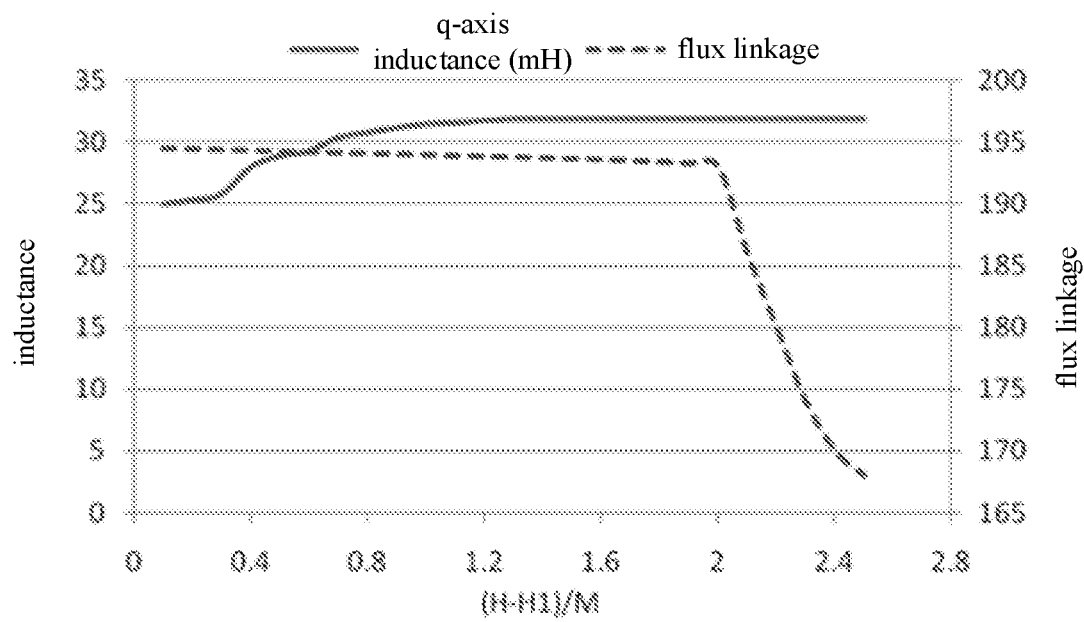
FIG. 15 is a schematic diagram showing an effect of a length of a bent slot at an end of a permanent magnet slot of a rotor structure on a performance of a motor.
Figure 16:
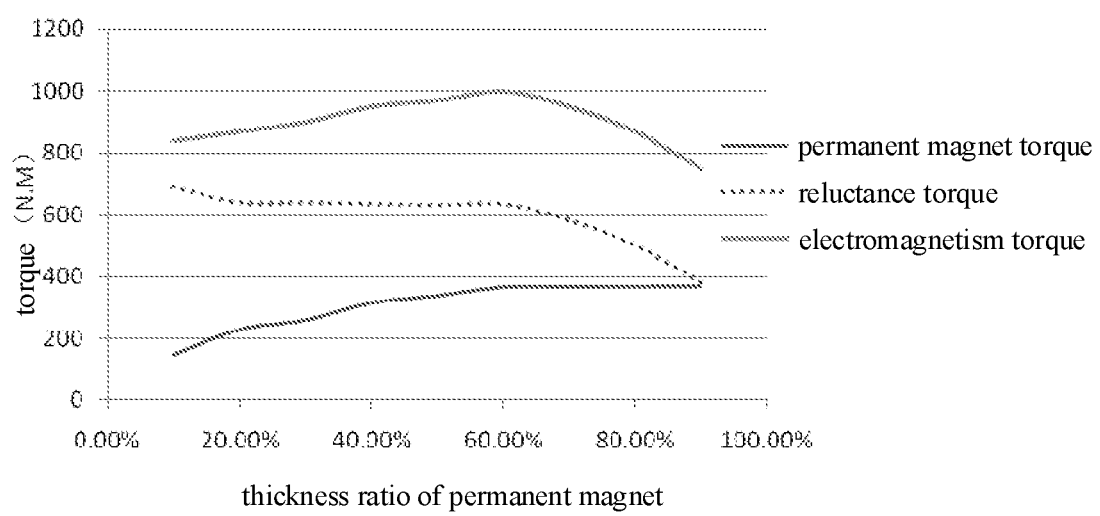
FIG. 16 is a schematic diagram showing a relationship between a thickness ratio of a permanent magnet of a rotor structure and a torque.
Figure 17:
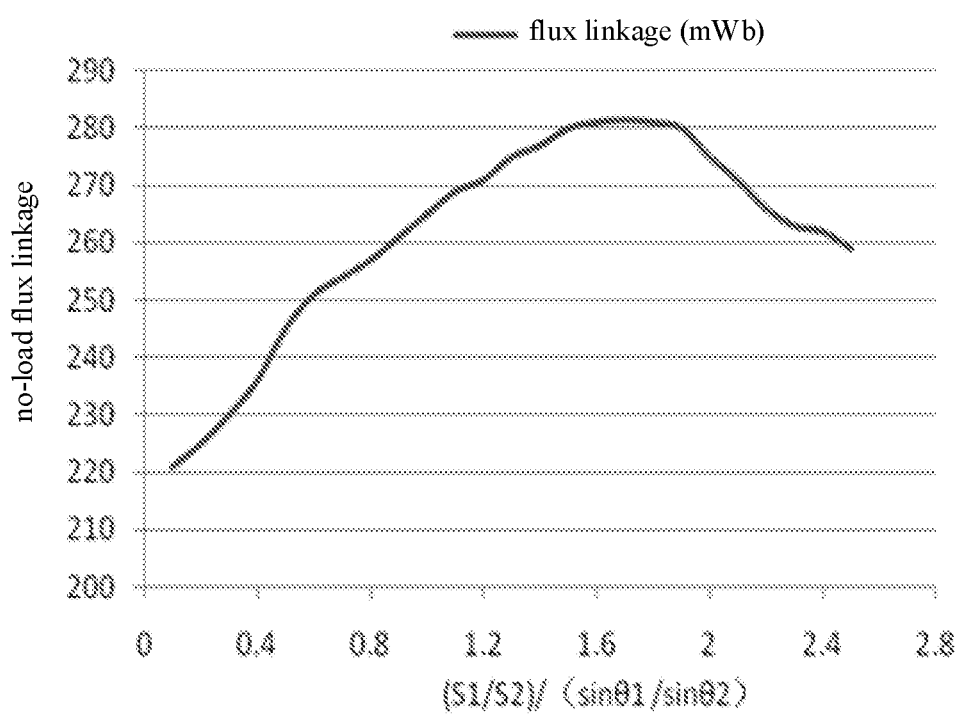
FIG. 17 is a schematic diagram showing an effect of a ratio of an area of an inner layer of permanent magnet slot to an area of an outer layer of permanent magnet slot of the rotor structure on a flux linkage.

As shown in FIG. 15, a study finds that the length of the bent portion of the permanent magnet slot has a greater effect on the q-axis inductance of the motor and the flux linkage of the motor. When $0.4 \times M \leq (H-H1)$, the q-axis inductance can be significantly improved. However, when (H–H1) is greater than 2×M, a reduction in a magnetic flux area of a second layer of permanent magnet can be caused, which results in a decrease in a motor no-load flux linkage. Therefore, preferably, $0.4 \times M \leq (H-H1) \leq 2 \times M$.

In addition, no permanent magnet is placed in the bent portion of the permanent magnet slot, which can effectively slow down a local demagnetization of the end of the permanent magnet and improve the anti-demagnetization ability of the motor.

The rotor permanent magnet of the motor is a ferrite permanent magnet. An arc is made with the center of the rotor as a rotating shaft hole. The arc passes through a center point P of the outer edge line of the outermost layer of permanent magnet. The ratio of a sum of the thicknesses of the rotor permanent magnet at the arc to the circumference of the arc is 55% to 65%. When the rotor permanent magnet of the motor is a ferrite, by setting the thickness of the permanent magnet within the above range, a ratio of the thickness of the permanent magnet to the thickness of the magnetic conduction channel is in a better range. Not only a high working point of the permanent magnet can be ensured, and the larger anti-demagnetization ability and the higher motor no-load flux linkage are obtained, but also a relatively large difference between a quadrature-axis inductance and a direct-axis inductance of the motor can be obtained, and the reluctance torque of the motor is improved.

In the present embodiment, in order to enhance a mechanical strength of the rotor, one or more magnetic isolation bridges are provided between the layers of the permanent magnet slots.

As shown in FIG. 10, the number of the layers of the rotor permanent magnets is two, the outer layer of permanent magnet slot is substantially in a V-shape. A length of a permanent magnet on one side of the V-shaped permanent magnet slot is L, and a maximum width of the permanent magnet arranged in V-shape is C, which satisfies $0.8 \times C \leq L$. The outer layer of permanent magnet slot is substantially in a U-shape and consists of at least three sections of permanent magnets. A ratio of a surface area of the outer layer of permanent magnet adjacent to an outer side of the rotor to a surface area of the inner layer of permanent magnet adjacent to the outer side of the rotor is S1/S2. Angles formed by outer vertices of the end portions of the outer layer of permanent magnet and the inner layer of permanent magnet adjacent to the outer surface of the rotor and the center of the rotor is 2×θ1 and 2×θ2, respectively, which satisfy the following relationship: $1.3 \times (\sin\theta1/\sin\theta2) \leq S1/S2 \leq 2 \times (\sin\theta1/\sin\theta2)$. By setting the arrangement shape of the outer layer of permanent magnet and the ratio of the surface area of the inner layer of permanent magnet to the surface area of the outer layer of permanent magnet, the working point of the permanent magnet can be better adjusted, such that an average working point of the inner layer and outer layer of permanent magnets becomes higher, and a proportion of magnetic field lines of the inner layer of permanent magnet entering the outer layer of permanent magnet and that directly entering the stator portion 20 are more reasonable, thereby increasing the flux linkage of the permanent magnet of the motor, and improving the efficiency and power factor of the motor. The effect of the ratio of the surface area of the inner layer of permanent magnet to the surface area of the outer layer of permanent magnet on the flux linkage of the motor is shown in the figure. By setting the ratio of the surface area of the inner layer of permanent magnet to the surface area of the outer layer of permanent magnet to satisfy $1.3 \times (\sin\theta1/\sin\theta2) \leq S1/S2 \leq 2 \times (\sin\theta1/\sin\theta2)$, a relatively large motor no-load flux linkage can be obtained. Preferably, $1.5 \times (\sin\theta1/\sin\theta2) \leq S1/S2 \leq 1.8 \times (\sin\theta1/\sin\theta2)$.

A width of the magnetic conduction channel formed between the inner layer of rectangular permanent magnet and the outer layer of rectangular permanent magnet is not constant. The closer the magnetic conduction channel is to the outer surface of the rotor, the smaller the width of the magnetic conduction channel is. Through the design that the width of the magnetic conduction channel is gradually reduced, the magnetic flux areas of the inner layer of permanent magnet and the outer layer of permanent magnet can be better adjusted, and the consistent adjustment of the working points of the inner layer of permanent magnet and the outer layer of permanent magnet can be achieved. The end of the inner layer of permanent magnet slot has a turn toward the magnetic pole boundary line, which can better distribute the number of the magnetic field lines entering the magnetic conduction channel f2 and the magnetic conduction channel f3, reduce the local saturations of the magnetic conduction channels, and improve the reluctance torque of the motor. An end of each permanent magnet slot has a turn toward the magnetic pole boundary line, which can further adjust the distribution of magnetic field lines of each magnetic conduction channel and reduce the local saturation. All rotor poles are evenly distributed on the circumference.

In the present embodiment, the permanent magnet auxiliary synchronous reluctance motor is used as a drive motor of an electric vehicle, which can effectively reduce the cost of the motor and reduce the dependence of the new energy electric vehicle on rare earth resources. At the same time, the present motor combines characteristics of a high efficiency of a rare earth permanent magnet motor and a high reliability of an asynchronous motor, which can better promote the development of the new energy vehicles.

The above descriptions are merely preferred embodiments of the present disclosure and are not intended to limit the present disclosure. Those skilled in the art can make various modifications and changes to the present disclosure, any modification, equivalent replacement, improvement, etc. made within the spirit and principle of the present disclosure should be included in the protection of scope of the present disclosure.

The invention claimed is:

1. A permanent magnet auxiliary synchronous reluctance motor, comprising:
   a stator portion comprising a stator core and a winding embedded in the stator core, the stator core having a stator tooth and a stator slot; and
   a rotor portion disposed in the stator portion, wherein a rotor body of the rotor portion is provided with a plurality of permanent magnet slot groups, the plurality of permanent magnet slot groups are evenly arranged along a circumferential direction of the rotor body, each of the permanent magnet slot groups is provided with multiple layers of permanent magnet slots, a distance between an end portion of a permanent magnet slot in a permanent magnet slot group and an end portion of an adjacent permanent magnet slot in an adjacent permanent magnet slot group is less than or equal to a width of a stator tooth shoe of the stator tooth, and a number of the permanent magnet slots per pole and per phase of the motor is two or three;
   wherein a permanent magnet slot group comprises an outer layer of permanent magnet slot and an inner layer of permanent magnet slot, a magnetic conduction channel is formed between the outer layer of permanent magnet slot and the inner layer of permanent magnet slot, the inner layer of permanent magnet slots of two adjacent permanent magnet slot groups are arranged adjacently;
   wherein the plurality of permanent magnet slot groups comprise a first permanent magnet slot group, the first permanent magnet slot group comprises a first inner layer of permanent magnet slot and a first outer layer of permanent magnet slot, a first magnetic conduction channel is formed between the first inner layer of permanent magnet slot and the first outer layer of permanent magnet slot;
   wherein an end portion of the outer layer of permanent magnet slot and an end portion of the inner layer of permanent magnet slot are both disposed toward the outer edge of the rotor body, and magnetic isolation bridges having an equal width are formed between the outer layer of permanent magnet slot and the outer edge of the rotor body, and between the inner layer of permanent magnet slot and the outer edge of the rotor body;
   wherein a distance from an end portion of the first outer layer of permanent magnet slot to the outer edge of the rotor body is H, a width of the end portion of the first outer layer of permanent magnet slot is M, and a width of the magnetic isolation bridge is H1, satisfying $0.4 \times M \leq (H-H1) \leq 2 \times M$.

2. The permanent magnet auxiliary synchronous reluctance motor of claim 1, wherein a distance between end portions of adjacent inner layer of permanent magnet slots is less than or equal to a width of the stator tooth.

3. The permanent magnet auxiliary synchronous reluctance motor of claim 2, wherein the plurality of permanent magnet slot groups further comprise a second permanent magnet slot group, the second permanent magnet slot group comprises a second inner layer of permanent magnet slot and a second outer layer of permanent magnet slot, a second magnetic conduction channel is formed between the second inner layer of permanent magnet slot and the second outer layer of permanent magnet slot; a third magnetic conduction channel is formed between a portion of the first inner layer of permanent magnet slot and a portion of the second outer layer of permanent magnet slot.

4. The permanent magnet auxiliary synchronous reluctance motor of claim 3, wherein the first permanent magnet slot group further comprises:
   a first slot bent relative to the first inner layer of permanent magnet slot, wherein a first end of the first slot is in communication with a first end of the first inner layer of permanent magnet slot, a second end of the first slot extends toward an outer edge of the rotor body; the first bent slot has a first cut edge; a first end of the first cut edge is connected to a side wall of the first inner layer of permanent magnet slot adjacent to the first outer layer of permanent magnet slot; a second end of the first cut edge is arranged to extend toward the outer edge of the rotor body and gradually away from the first outer layer of permanent magnet slot; the second end of the first cut edge is connected to a side wall of the first bent slot extending along a circumferential direction of the rotor body.

5. The permanent magnet auxiliary synchronous reluctance motor of claim 4, wherein the second permanent magnet slot group further comprises:
   a second slot bent relative to the second inner layer of permanent magnet slot, wherein a first end of the second slot is in communication with a first end of the second inner layer of permanent magnet slot; the first slot is disposed adjacent to the second slot; a second end of the second slot extends toward the outer edge of the rotor body; the second slot has a second cut edge; a first end of the second cut edge is connected to a side wall of the second inner layer of permanent magnet slot adjacent to the second outer layer of permanent magnet slot; a second end of the second cut edge is arranged to extend toward the outer edge of the rotor body and gradually away from the second outer layer of permanent magnet slot; the second end of the second cut edge is connected to a side wall of the second bent slot extending along the circumferential direction of the rotor body; a distance between the second end of the first cut edge and the second end of the second cut edge is LA, a width of the stator tooth shoe is LC, satisfying $LA \leq LC$.

6. The permanent magnet auxiliary synchronous reluctance motor of claim 5, wherein the first permanent magnet slot group further comprises:

a third bent slot, wherein a first end of the first bent slot is in communication with a second end of the first inner layer of permanent magnet slot; a second end of the third bent slot extends toward the outer edge of the rotor body; the third bent slot and the first bent slot are disposed symmetrically with respect to a direct axis of the first permanent magnet slot group; a first angle is formed between a geometric center line of the first bent slot or the third bent slot and a geometric center line of the first inner layer of permanent magnet slot in a length direction.

7. The permanent magnet auxiliary synchronous reluctance motor of claim 6, wherein the second permanent magnet slot group further comprises:

a fourth bent slot, wherein a first end of the fourth bent slot is in communication with a second end of the second inner layer of permanent magnet slot; a second end of the fourth bent slot extends toward the outer edge of the rotor body; the fourth bent slot and the second bent slot are disposed symmetrically with respect to a direct axis of the second permanent magnet slot group; a second angle is formed between a geometric center line of the second bent slot or the fourth bent slot and a geometric center line of the second inner layer of permanent magnet slot in a length direction.

8. The permanent magnet auxiliary synchronous reluctance motor of claim 5, wherein the first permanent magnet slot group further comprises:

a fifth bent slot, wherein a first end of the fifth bent slot is in communication with a first end of the first outer layer of permanent magnet slot; a second end of the fifth bent slot extends toward the outer edge of the rotor body; and the fifth bent slot is disposed adjacent to the first bent slot.

9. The permanent magnet auxiliary synchronous reluctance motor of claim 8, wherein the second permanent magnet slot group further comprises:

a sixth bent slot, wherein a first end of the sixth bent slot is in communication with a first end of the second outer layer of permanent magnet slot; a second end of the sixth bent slot extends toward the outer edge of the rotor body; the sixth bent slot is disposed adjacent to the second bent slot; and a rotating shaft hole angle formed between a connection line which is formed between an end portion of a side wall of the fifth bent slot adjacent to the direct axis of the first permanent magnet slot group and a rotating shaft hole of the rotor body, and a connection line which is formed between an end portion of a side wall of the sixth bent slot adjacent to the direct axis of the second permanent magnet slot group and the rotating shaft hole of the rotor body is θb.

10. The permanent magnet auxiliary synchronous reluctance motor of claim 9, wherein there are a plurality of stator teeth, and the plurality of stator teeth are evenly arranged along an inner circumference surface of a stator body of the stator portion; the plurality of stator portions comprise a first stator tooth, a second stator tooth, and a third stator tooth arranged in sequence; a rotating shaft hole angle formed between a connection line which is formed between a point on an end portion of a stator tooth shoe of the first stator tooth away from the second stator tooth and the rotating shaft hole of the rotor body, and a connection line which is formed between a point on an end portion of a stator tooth shoe of the third stator tooth away from the second stator tooth and the rotating shaft hole of the rotor body is θc, satisfying θb≤θc.

11. The permanent magnet auxiliary synchronous reluctance motor of claim 9, wherein a pole arc corresponding to any two adjacent stator teeth is θc1, satisfying θb≤θc1.

12. An electric vehicle comprising a permanent magnet auxiliary synchronous reluctance motor, wherein the permanent magnet auxiliary synchronous reluctance motor is the same as that of claim 1.

* * * * *